Jan. 16, 1934.  J. C. ARNOLD  1,943,360
PHOTOGRAPHIC APPARATUS
Filed Nov. 2, 1931  3 Sheets-Sheet 2
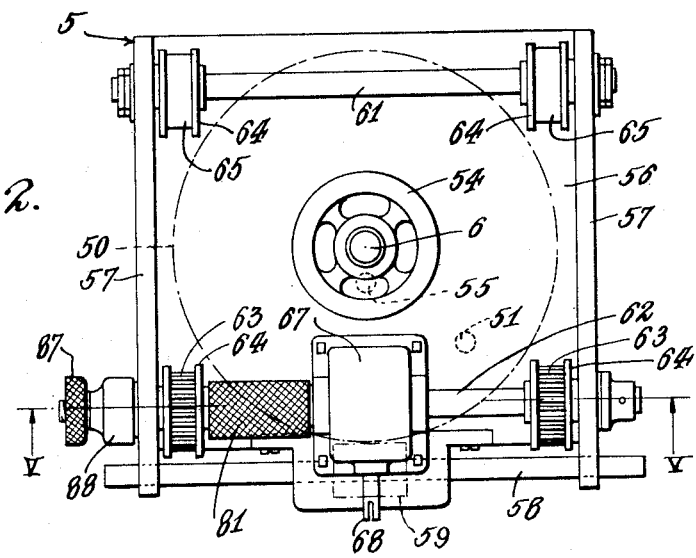
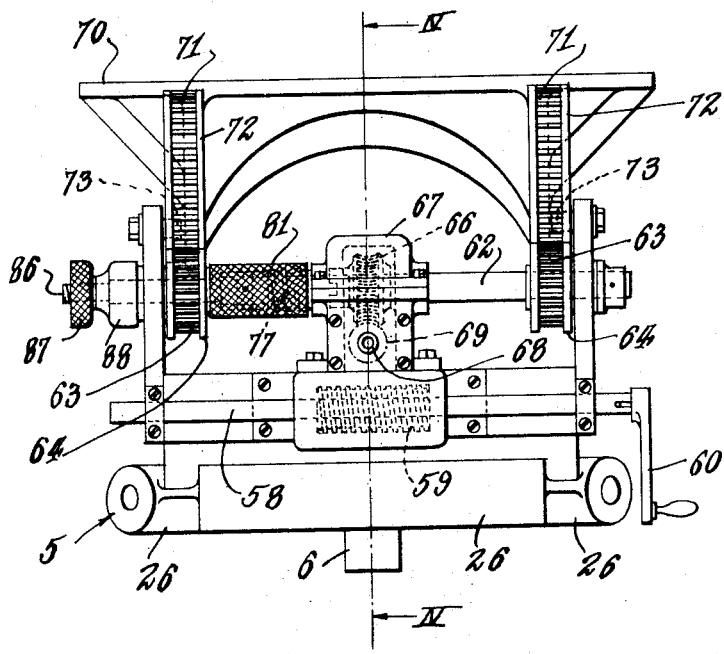
Inventor
John C. Arnold
By Lyon & Lyon
Attorneys Inventor
John C. Arnold
By Lyon & Lyon
Attorneys Patented Jan. 16, 1934

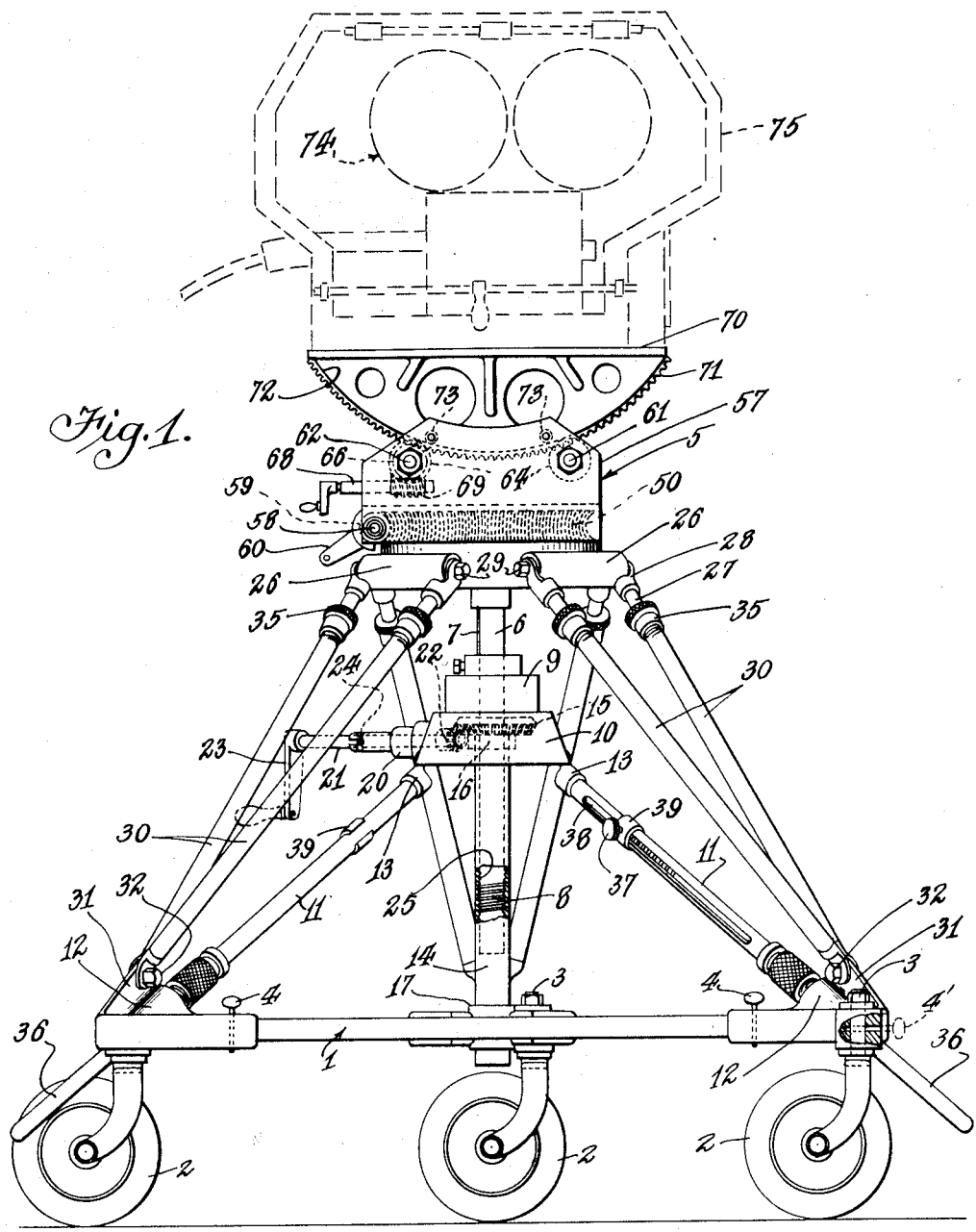

1,943,360

UNITED STATES PATENT OFFICE 1,943,360

PHOTOGRAPHIC APPARATUS

John C. Arnold, Los Angeles, Calif., assignor to Metro-Goldwyn-Mayer Corporation, Culver City, Calif., a corporation of New York Application November 2, 1931. Serial No. 572,501

2 Claims. (Cl. 248—47)

This invention relates to an apparatus adapted for supporting and directing motion picture cameras. More particularly, the invention relates to a tripod provided with means for moving the camera supported thereby in a vertical plane without materially moving the center of gravity of the camera.

Generally described, the invention may be said to relate to a new and novel form of tripod and tripod head or camera support carried thereby, for use in conjunction with motion picture cameras and other photographic equipment of like character.

Tripods of the ordinary type can not be used advantageously in conjunction with cameras which have been enclosed in hoods or bungalows, such hoods being employed to prevent the sound of the camera mechanism from interfering with the recordation of sounds during the taking of a scene. The bungalows are fairly heavy, and when such bungalows and cameras are attached to an ordinary type of tripod and it is then desired to tip the camera so as to direct the lens downwardly or upwardly, there is a tendency for the weight of the camera and bungalow to unbalance the tripod. In accordance with this invention, however, the tripod is provided with means adapted to move the camera head in a vertical plane without materially moving the center of gravity of the camera and bungalow supported thereby. In addition, the camera head or support is provided with means permitting ready rotation of the camera in a horizontal plane or in the plane of the camera support.

Although the construction of the invention as disclosed, described and claimed herein may be materially changed without departing from the spirit of the invention, one preferred embodiment of the invention will be described in detail for purposes of illustration.

In describing the invention, reference will be had to be appended drawings, in which:

Fig. 1 is a side elevation of one form of tripod and head embraced by this invention.

Fig. 2 is a plan view of the means for moving the camera head in a vertical plane.

Fig. 3 is an enlarged end view of the camera head shown in Figs. 1 and 2.

Figure 4:
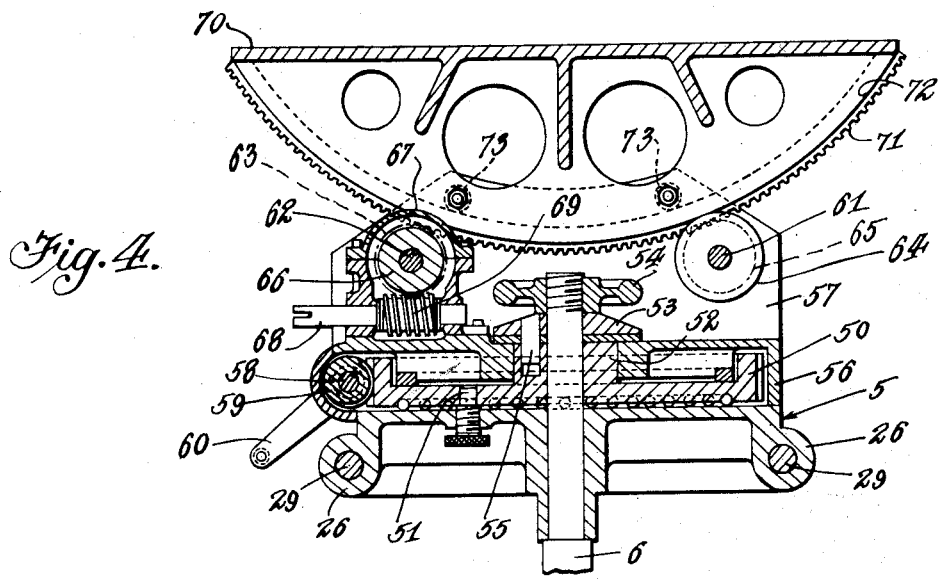
Fig. 4 is a vertical section taken through the camera head along line 4—4 indicated in Fig. 3.

Referring to the drawings, the tripod may comprise a substantially horizontal frame 1, which preferably is triangular in plan. It will be understood that it is not necessary to employ three legs to a tripod as a four legged device may be readily constructed along the lines of this invention, without materially changing the construction.

The lower frame 1, described hereinabove, may be made of pipe sections suitably welded together, and castors or rubber tired wheels 2 may be pivotally connected, as indicated at 3, to the frame 1. This will permit the frame to be readily wheeled in any direction, the castors or wheels 2 pivoting as at 3 to permit rapid change in direction of movement.

When it is desired that the frame 1 move in a single direction only, pins 4 (normally carried in apertures made in the frame 1) may be inserted, as indicated at 4' in Fig. 1, so as to prevent the wheels 2 from pivoting at 3, the pin 4' passing through a suitable aperture in the pin upon which the wheel 2 rotates.

A vertically adjustable camera support 5 is preferably carried by the frame and any suitable means for vertically adjusting and positioning the camera support 5 may be provided. As indicated in the drawings, the camera support 5 may be mounted upon the upper end of a shaft 6 provided with a key-way 7, and with threads 8 cut upon a portion of said shaft 6. The shaft 6 may be slidably held in a collar 9 attached to or integral with a hollow housing 10, said hollow housing being supported by the frame 1 through a plurality of hollow members 11 rigidly connected to the frame 1 as at 12 and to the housing 10 as by means of the connecting members 13. The members 11 maintain the housing 10 and the collar 9 in fixed position.

The collar 9 is preferably provided with a key adapted to slidably fit in the key-way 7 formed in the shaft 6, so as to prevent the rotation of the shaft 6 and the camera support 5, although permitting the vertical movement of the shaft 6 through the collar.

A sleeve 14 may be centrally positioned within the housing 10, a bevel gear 15 being mounted on the upper end of the sleeve 14. The gear 15 and the sleeve 14 may be supported within the housing 10 by means of a bearing 16 connected to or supported by said housing 10. The lower end of the sleeve 14 may be journaled in a suitable bearing 17 held by the frame 1 as by members extending inwardly from the sides of the frame 1.

A boss 20 may extend from the housing 10 and a shaft 21 may be journaled in said boss, said shaft 21 carrying a bevel gear 22 adapted to operatively engage with the bevel gear 15. A crank handle 23 may be pivotally connected to the shaft 21 as at 24, so as to permit the rotation of the shaft 21 by operation of the crank 23. Rotation of the crank 23 and shaft 21 will, therefore, cause the rotation of the bevel gear 15 and the sleeve 14 connected thereto.

The interior of the sleeve 14 may be threaded as indicated at 25, so as to permit the threads 8 on the shaft 6 to engage therewith. In this manner, rotation of the sleeve 14 will be translated into a vertical lineal motion of the shaft 6, rotation of the shaft 6 being prevented by the key-way 7 cooperating with a suitable key positioned in the collar 9.

Means for steadying the camera support 5 may be provided. As shown in the drawings, the camera support 5 is provided with three cylindrical bosses 26, tangentially attached to or integral with the camera support 5. Tubular members 27 are pivotally connected to the bosses 26 by means of connecting members 28 and pins 29. The tubular members 27 are slidably received in tubular members 30, which in turn are pivotally connected to webs 31 extending upwardly from the frame 1. The members 30 may be connected to the web 31 as by means of the pins 32.

Suitable clamping or locking means 35 may be carried by the upper ends of the members 30 so as to permit the members 27 to be released and the entire head assembly raised by operation of the crank 23 when desired, the sliding and telescoping relation between the members 27 and 30 being terminated and such members locked relatively to each other by operation of the means 35. A specific form of construction is disclosed in my co-pending application Serial No. 369,371.

The slotted members 11 which maintain the collar 9 and housing 10 in stationary positions upon the frame 1, are inclined at a fixed angle with the horizontal. The hollow members 11 slidably carry legs 36, said legs 36 being longitudinally movable within the hollow members 11.

Means may be provided for adjustably positioning the legs 36 within the hollow members 11. As shown in the drawings, such means may include a thumb screw 37 carried by the upper end of the legs 36, the shaft of the thumb screw 37 extending through the slot 38 formed longitudinally of the member 11. A split collar 39 partly encircling the member 11 may also be carried by the thumb screw 37. A screw operated by the thumb screw 37 and extending through the split collar 39 may engage with an internally threaded bore in the upper end of the leg 36 within the tubular member 11 so that the leg 36 may be retained within the member 11 in any desired position by tightening the thumb screw 37.

A ring gear 50 provided with a boss 52 may be mounted upon the camera head 5, bearings being positioned between the ring gear 50 and the camera head 5. A capping plate 53 may be carried by the shaft 6, and the capping plate 53 may be rigidly connected to the ring gear 50 by means of a pin 55 extending into the boss 52. The capping plate 53 and the ring gear 50 may be held in contact with the camera head 5 by means of a hand wheel 54 in threaded engagement with the end of shaft 6. Ordinarily, the ring gear 50 may be stationary with respect to the camera head 5 and maintained in such position by means of a pin 51, threadedly mounted in the camera head 5 and adapted to be received in an aperture formed in the ring gear 50.

The ring gear 50 may be enclosed within a housing 56 provided with vertical end plates 57. A shaft 58 may be journaled in the housing 56, said shaft carrying a worm gear 59 adapted to operatively engage the ring gear 50. Any suitable type of gear handle, such as the handle 60, may be attached to the shaft 58 so as to actuate the worm gear 59, and thereby cause the housing 56 to rotate around the stationary ring gear 50 and the camera support 5.

When the pin 51 is inserted in the aperture formed in the ring gear 50, then the operation of the crank handle 60 will cause the housing 56 to rotate around the stationary ring gear 50. If, however, it is desired to quickly turn the entire housing 56 and camera head 70 carried thereby, then the pin 51 will be withdrawn from the aperture in the ring gear 50, thereby permitting the manual operation and rotation of the entire housing 56 and ring gear 50 upon the stationary camera head 5.

Two spaced parallel shafts may be journaled in the end plates 57, such as for example, the shafts 61 and 62. Shaft 62 may carry mounted thereon spur or helical gears 63 provided with shoulders 64. The shaft 61 may carry rollers 65 also provided with shoulders 64. The shaft 62 may also carry a ring gear 66 enclosed in an auxiliary housing 67 which may be attached to or be made a part of the movable housing 56.

A shaft 68 may be journaled in the auxiliary housing 67, the shaft 68 carrying a worm gear 69 adapted to operatively engage with the ring gear 66. By rotating the shaft 68 by any suitable means, as for example, a crank handle, the rotation of the shaft 68 may be translated into a rotation of the shaft 62 and gear 63 carried thereby.

A suitable camera head or member on which the camera or camera bungalow may rest, such as the camera head 70 provided with segmental spur or herring-bone gears 71, may rest upon the gear 63 and roller 65, the segmental gears 71 operatively engaging the gears 63.

Flanges 72 may be provided on the segmental gears 71, said flanges cooperating with the flanges 64 extending from gears 63 and rollers 65. Contact between the camera head 70 and the gears and roller 65 may be maintained by forming a groove or depression paralleling the pitch circle of the segmental gear 71, rollers 73 carried by the sides 57 cooperating with said groove or depression so as to maintain the camera head 70 and particularly the gears 71 in contact with the gears 63 and roller 65. Any suitable type of camera such as that generally indicated at 74, with or without a housing or bungalow 75, may then be attached or secured to the camera head 70, as shown in Fig. 1.

Figure 5:
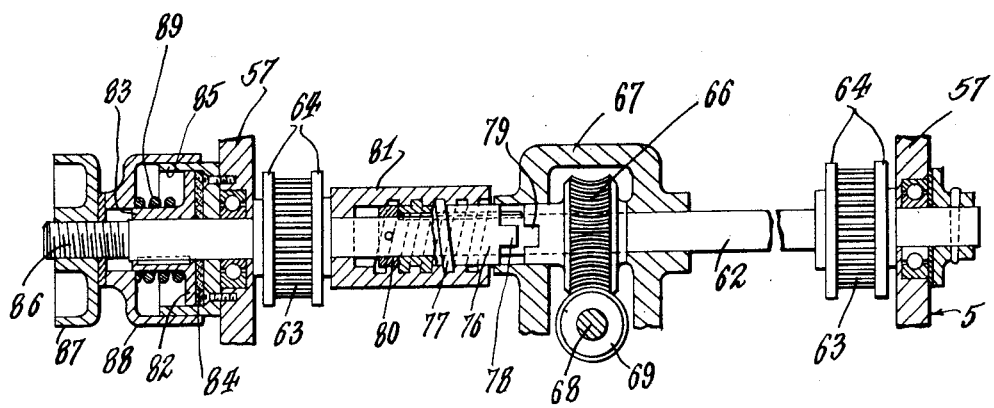
Fig. 5 is a vertical section taken along the plane 5—5 of Fig. 2.

The worm gear 66 may be directly mounted on the shaft 62 for the hereinabove described operation, but it may be desired to provide means to permit the camera head 70 to be moved angularly with respect to the horizontal plane upon the gears 63 by hand. Means for accomplishing this purpose may comprise a sleeve 76 keyed onto the shaft 62, and adapted to slide longitudinally of said shaft. Preferably, the sleeve 76 is provided with a male thread 77 and the end of the sleeve facing the ring gear 66 is provided with one or more longitudinal extensions or fingers 78. The hub of ring gear 66 may be provided with complementary openings or notches 79 adapted to receive the lugs or fingers 78. A collar or stop 80 may be mounted on the shaft 62 so as to prevent the movement of the sleeve 76 toward the left in Fig. 5 beyond a certain predetermined point.

Exteriorly of the shaft 62 and of the sleeve 76 may be mounted a sleeve 81, provided with an internally cut thread adapted to receive the thread 77. In this manner manual rotation of the sleeve 81 may be caused to move the sleeve 76 longitudinally upon the shaft 62, and thereby engage the ring gear 66 with the sleeve 76 and with the shaft 62. It is to be understood that when this selective means for causing engagement between the ring gear 66 and the shaft 62 is employed, the ring gear 66 is not directly keyed to the shaft 62 but is merely journaled thereon.

When the ring gear 66 is disconnected from the shaft 62 by moving the sleeve 76 longitudinally along the shaft 62, so as to withdraw the finger 78 from the aperture 79 formed at the position of the ring gear 66, then the camera head 70 carrying the segmental gears 71 may be moved manually and without cranking or otherwise rotating the worm gear 69. In order to regulate the tension or resistance to manual movement of the camera head 70, a separate means may be provided, said means including a disc 82 mounted upon a hub 83 keyed to the shaft 62. The disc 82 may face a fibrous or any other suitable washer or bearing surface 84 retained in a housing 85 connected to the side or end plates 57.

The pressure exerted by the disc 82 upon the washer 84 may be varied in any desired manner. For example, the end of the shaft 62 may be threaded as indicated 86 and a knurled knob 87 mounted thereon. A flanged cap 88 adapted to slidably engage with the hub 83 and to slide upon the cup-shaped member 85 may, by operation of the knurled knob 87, be moved toward the side or end plate 57. Preferably, a compression spring 89 is positioned within the flanged cap 88, the spring 89 bearing against the cap 88 and against the disc 82. By moving the flanged cap 88 by operation of the knurled knob 87, the force with which the disc 82 bears against the washer 84 may thus be varied, and in this manner the resistance offered to the manual movement of the camera support 70 and the rotation of shaft 62 thus created, can be regulated.

The uses, advantages and mode of operation of the device described hereinabove will be readily apparent. When the legs 36 are withdrawn into the hollow members 11 and maintained in said withdrawn position by operation of the knurled thumb screws 37 and engaging members 39, the entire tripod and camera may be readily moved in any direction upon the castors or wheels 2, which freely pivot upon their vertical axes and on their horizontal axes. If it is desired to move the camera in one direction only and to maintain it in said direction, the pins 4 may be inserted through the vertical axes of said castors, as indicated at 4', thereby locking the castors in alignment with each other.

In order to raise the camera support and the entire camera in a vertical plane, the collars 35 may be loosened and the crank 23 operated, thereby causing the shaft 6 to move in a vertical plane and thereby move the entire camera support and head in a vertical plane. When the proper height has been reached, the collars 35 may be tightened, causing the outer tubular members 30 to grip the internal telescoping members 27.

If it is desired to tilt the camera or camera head 70 at an angle to the horizontal, the shaft 68 is operated, thereby causing the gears 66 to move the segmental gears 71. This rocking motion of the camera head 70 causes the camera to be tilted. The pitch diameter of the gears 71 is such that when the camera head 70 and the camera 74 are moved or tilted, the center of gravity of the camera or of the camera and bungalow are not appreciably displaced, but instead maintained substantially above the longitudinal axis of the vertical shaft 6. The camera 74 and the bungalow 75 are so positioned on the head 70 that when the head 70 is in the horizontal plane, the center of gravity of the camera or camera and bungalow is substantially in alignment with an extension of the axis of the shaft 6. The segmental gears 71 are then preferably of such pitch radius that a line connects the centers of pitch diameters of such gears approximately through the center of gravity of the camera or camera and bungalow supported by the head 70. The stability of the tripod is, therefore, not destroyed by even an exaggerated tipping of the camera or camera head.

If it is desired to rotate the camera head independently of the tripod, this may be accomplished by operation of the shaft 58 by crank handle 60. Operation of the shaft 58 causes the entire movable housing 56 and plates 57 and camera head 70 carried thereby, to pivot around the vertical axis, passing through the center of the ring gear 50 and of the shaft 6.

It will be noticed that the crank 60 will also move around the vertical axis of the tripod, thereby permitting the cameraman to follow the object which he desires to photograph without placing him in an awkward position as regards the operation of the shaft 58.

When the tripod has been moved upon its castors or wheels 2 into a proper position and it is then desired to anchor the tripod and camera in position, the legs 36 may be actuated. The legs 36 make a predetermined and substantially constant angle with the horizontal plane. In order to cause the tripod to rest on the legs instead of being supported on the castors, the thumb screws 37 are released, thereby permitting the legs 36 to be moved within the hollow members 11 and clamped in a lowered position, raising the tripod and castors 2 out of contact with the ground by operating suitable means 44, more particularly described in my co-pending application Serial No. 369,371.

An apparatus is therefore provided which is capable of supporting various photographic implements such as cameras, projectors, and the like, the apparatus being readily moved and readily anchored. Means have been provided to permit the photographic apparatus carried by the tripod described hereinabove to be moved in a vertical plane to be rotated in a horizontal plane, and to be angularly displaced in any vertical plane passing through the vertical axis of the tripod.

The angular displacement of the vertical plane may be accomplished in such manner as to prevent the center of gravity of the apparatus carried by the tripod from being materially varied or shifted with relation to the vertical axis of the tripod. In this manner, the stability of the apparatus is high, no matter what position is assumed by the photographic apparatus carried thereby.

Although a particular construction has been described in detail, it is to be understood that the purpose of such description and presentation of details is merely for purposes of illustration, and numerous changes and modifications may be made without departing from the invention described herein. All such changes and modifications as come within the scope of the appended claims are embraced thereby.

I claim:

1. In an apparatus of the character described, a supporting plate, a ring gear provided with a face rotatably mounted on said supporting plate, a housing provided with vertical side plates rotatably mounted on said supporting plate and enclosing said ring gear, a driving shaft journaled in said housing, said shaft being provided with a worm gear in engagement with said ring gear whereby said housing may be rotated on said supporting plate by actuating said driving shaft, spaced shafts journaled in said side plates, spaced spur gears carried by one of said shafts, a second ring gear loosely journaled on said shaft, a sleeve provided with an external male thread keyed on said shaft for longitudinal motion thereon, the end of said sleeve being provided with means adapted to engage with said second ring gear, and a second sleeve mounted on said shaft, said second sleeve being provided with an internally cut thread adapted to engage the male thread of said sleeve whereby rotation of the second sleeve with respect to said shaft will impart longitudinal motion to said sleeve into and out of engagement with said second ring gear.

2. In an apparatus of the character described, a supporting plate, a ring gear provided with a face rotatably mounted on said supporting plate, a housing provided with vertical side plates rotatably mounted on said supporting plate and enclosing said ring gear, a driving shaft journaled in said housing, said shaft being provided with a worm gear in engagement with said ring gear whereby said housing may be rotated on said supporting plate by actuating said driving shaft, spaced shafts journaled in said side plates, spaced spur gears carried by one of said shafts, a second ring gear loosely journaled on said shaft, a sleeve provided with an external male thread keyed on said shaft for longitudinal motion thereon, the end of said sleeve being provided with means adapted to engage with said second ring gear, a second sleeve mounted on said shaft, said second sleeve being provided with an internally cut thread adapted to engage the male thread of said sleeve whereby rotation of the second sleeve with respect to said shaft will impart longitudinal motion to said sleeve into and out of engagement with said second ring gear, and a camera head provided with segmental gears in operative engagement with said spur gears.

JOHN C. ARNOLD.